US008735306B2

(12) United States Patent
Hatfield et al.

(10) Patent No.: US 8,735,306 B2
(45) Date of Patent: *May 27, 2014

(54) OLEOPHOBIC LAMINATED ARTICLE

(75) Inventors: Martin Gregory Hatfield, Odessa, MO (US); Nusrat Farzana, Lee's Summit, MO (US)

(73) Assignee: BHA Altair, LLC, Franklin, TN (US)

(*) Notice: Subject to any disclaimer, the term of this patent is extended or adjusted under 35 U.S.C. 154(b) by 353 days.

This patent is subject to a terminal disclaimer.

(21) Appl. No.: 12/916,790

(22) Filed: Nov. 1, 2010

(65) Prior Publication Data
US 2011/0041693 A1 Feb. 24, 2011

Related U.S. Application Data

(63) Continuation-in-part of application No. 12/040,199, filed on Feb. 29, 2008, now Pat. No. 7,825,046.

(51) Int. Cl.
*B32B 5/18* (2006.01)
*B32B 27/12* (2006.01)
*B32B 27/32* (2006.01)

(52) U.S. Cl.
USPC ............. 442/80; 442/82; 442/92; 442/94; 442/397

(58) Field of Classification Search
USPC ............ 442/80, 82, 91–95, 394–398
See application file for complete search history.

(56) References Cited

U.S. PATENT DOCUMENTS

| | | | |
|---|---|---|---|
| 5,539,072 A * | 7/1996 | Wu | 526/304 |
| 6,582,113 B2 | 6/2003 | Rogers | |
| 6,854,603 B2 | 2/2005 | Klare | |
| 7,534,471 B2 | 5/2009 | Klare et al. | |
| 7,771,818 B2 | 8/2010 | Klare et al. | |
| 2009/0211581 A1 * | 8/2009 | Bansal | 128/206.19 |
| 2009/0220764 A1 | 9/2009 | Hatfield et al. | |

FOREIGN PATENT DOCUMENTS

| | | |
|---|---|---|
| EP | 0641594 | 9/1994 |
| EP | 0707179 | 10/1995 |
| EP | 0829514 | 7/1997 |
| GB | 2302061 A | 1/1997 |
| GB | 2331043 A | 5/1999 |
| GB | 2457786 A | 9/2009 |
| GB | 2459749 A | 11/2009 |
| WO | 9958335 A1 | 11/1999 |

OTHER PUBLICATIONS

GB Search Report dated Dec. 8, 2011 from corresponding Application No. GB1118520.4.

* cited by examiner

*Primary Examiner* — Jennifer A Steele

(74) *Attorney, Agent, or Firm* — Reinhart Boerner Van Deuren P.C.

(57) ABSTRACT

An article comprising a microporous membrane. A first porous fabric is laminated to a first side of the microporous membrane. A second porous fabric is laminated to a second opposite side of the microporous membrane to form a laminate with the membrane and the first porous fabric. The laminate has two fabric sides separated by the microporous membrane. A treatment material is applied to the laminate to form a treated laminate. The treated laminate has an oil resistance of at least a number 7 determined by AATCC 118 testing on both fabric sides and has an air permeability through the treated laminate of at least 0.01 CFM per square foot determined by ASTM D737 testing.

17 Claims, 3 Drawing Sheets

OLEOPHOBIC LAMINATED ARTICLE

This application is a continuation-in-part application of our application Ser. No. 12/040,199, filed Feb. 29, 2008, and issuing as U.S. Pat. No. 7,825,046 on Nov. 2, 2010.

BACKGROUND

The invention is generally directed to a laminated article. In particular, the invention is directed to laminated sheet material having improved oleophobic properties and components, such as vents, made from the laminated sheet material.

Components made from laminated sheet material have many uses and can be made to have various properties. The properties often result from the manufacture of the laminated sheet material and the materials used to make them. The properties can also be modified by chemical treatments. In some applications, components made from the laminated sheet material are useful as or in vents, filters or apparel that allow the flow of gas, such as air through the component, while preventing or restricting the flow of certain liquids, such as water.

The laminated sheet material typically includes one or more porous layers of sheet material that are laminated together. The layers of sheet material may be treated with, or formed using, a material that prevents or resists the flow of selected matter through the layer. For example, a layer of the sheet material may be treated with, or formed using, a hydrophobic material to resist the passage of water through the component made from the laminated sheet material. It is very desirable that laminated sheet material is resistant to contamination by oil.

As the components made from laminated sheet material are used in more diverse applications and in harsher environments, improvements to the laminated sheet material and the components are desired.

BRIEF DESCRIPTION

One aspect of the invention is an article comprising a microporous membrane. A first porous fabric is laminated to a first side of the microporous membrane. A second porous fabric is laminated to a second opposite side of the microporous membrane to form a laminate with the membrane and the first porous fabric. The laminate has two fabric sides separated by the microporous membrane. A treatment material is applied to the laminate to form a treated laminate. The treated laminate has an oil resistance of at least a number 7 determined by AATCC 118 testing on both fabric sides and has an air permeability through the treated laminate of at least 0.01 CFM per square foot determined by ASTM D737 testing.

Another aspect of the invention is a vent that includes a microporous membrane of expanded polytetrafluoroethylene (ePTFE). A first porous fabric is laminated to a first side of the microporous membrane. A second porous fabric is laminated to a second opposite side of the microporous membrane to form a laminate with the membrane and the first porous fabric. The laminate has two fabric sides separated by the microporous membrane. A treatment material is applied to the laminate to form a treated laminate. The treated laminate has an oil resistance of at least a number 7 determined by AATCC 118 testing on both fabric sides and has an air permeability through the treated laminate of at least 0.01 CFM per square foot determined by ASTM D737 testing.

Yet another aspect of the invention is an article comprising a microporous membrane of expanded polytetrafluoroethylene (ePTFE). A first porous fabric is laminated to a first side of the microporous membrane. A second porous fabric is laminated to a second opposite side of the microporous membrane to form a laminate with the membrane and the first porous fabric. The laminate has two fabric sides separated by the microporous membrane. A treatment material is applied to the laminate to form a treated laminate. The treated laminate has an oil resistance of a number 8 determined by AATCC 118 testing on both fabric sides. The treated laminate also has an air permeability through the treated laminate of at least 0.05 CFM per square foot determined by ASTM D737 testing and a Mullen Water Entry pressure determined by challenging the membrane side of at least 10 PSI.

DRAWINGS

These and other features, aspects, and advantages of the invention will be better understood when the following detailed description is read with reference to the accompanying drawings, in which.

DETAILED DESCRIPTION

Various aspects of the invention relate to a laminated article and components made from the laminated article. The laminated article is illustrated, by way of example, as laminated sheet material. The components made from the laminated sheet material are illustrated, by way of example, as vents. It will be apparent that the laminated sheet material according to one aspect of the invention could also be used to make, without limitation, all or part of a filter, apparel, sleeping bag or tent.

Figure 1:
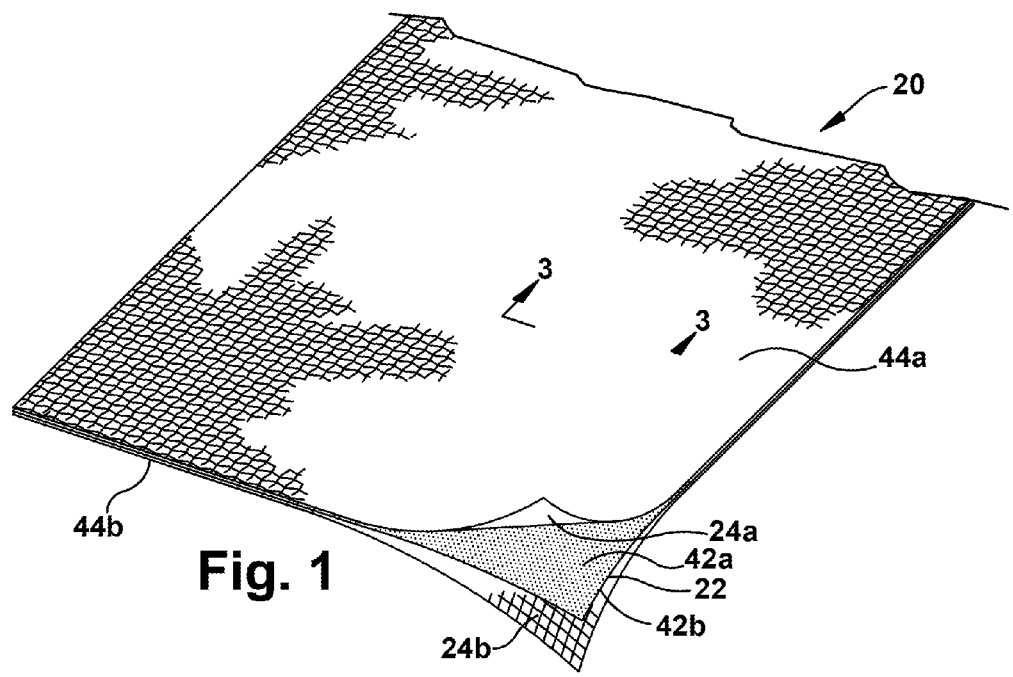
FIG. 1 is a perspective representation of laminated sheet material according to one aspect of the invention.
Figure 3:
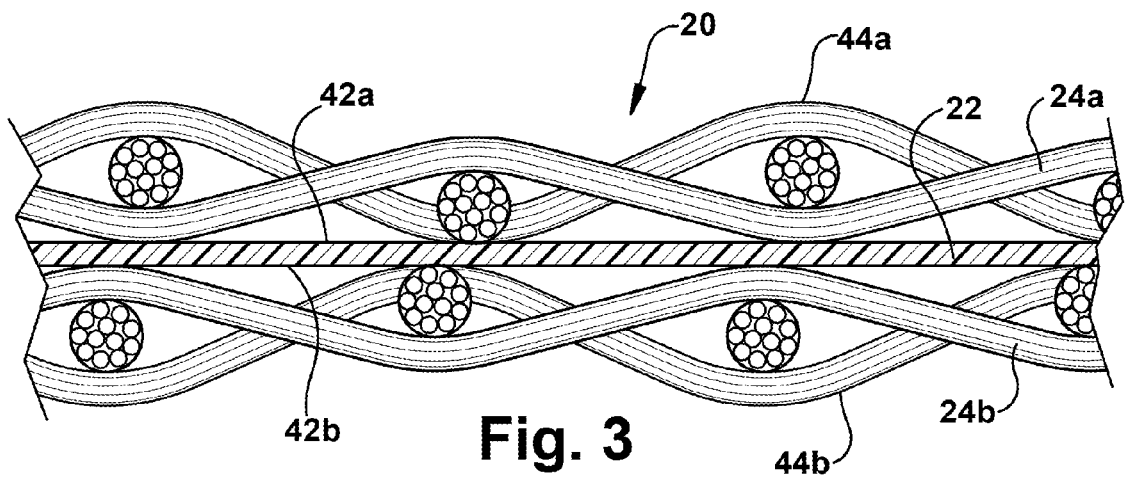
FIG. 3 is an enlarged cross-sectional view of a portion of the laminated sheet material illustrated in FIG. 1, taken approximately along the line 3-3 in FIG. 1.

FIGS. 1 and 3 illustrate a laminated article 20 as sheet material according to one aspect of the invention. The laminated article 20 includes a membrane 22. A first porous textile fabric 24a is adhered to a first side 42a of the membrane 22. A second porous textile fabric 24b is adhered to a second side 42b of the membrane 22 opposite the first side 24a of the membrane. The resulting laminated article 20 has two opposite facing fabric sides 44a, 44b.

The laminated article 20 is oleophobic and hydrophobic on both of the fabric sides 44a, 44b. That is, the laminated article 20 prevents or resists the passage of liquids, such as water, through the laminated article. The laminated article 20 is gas permeable and moisture vapor transmissive. That is, the laminated article 20 permits the passage of gases, such as air, carbon dioxide and water vapor, through it. An oleophobic treatment is applied to the entire laminated article 20 from an inorganic solvent according to one aspect of the invention to provide improved oleophobicity to at least both of the fabric sides 44a, 44b. The addition of the oleophobic treatment increases the resistance of the laminated article 20 to being fouled by oil or oily substances from either of the fabric sides 44a, 44b.

The membrane 22 is preferably a microporous polymeric membrane that allows the flow of gases, such as air or water vapor, into or through the membrane 22 and is hydrophobic. A preferred microporous polymeric membrane for use as the membrane 22 includes expanded polytetrafluoroethylene (ePTFE) that has preferably been at least partially sintered. An ePTFE membrane typically comprises a plurality of nodes interconnected by fibrils to form a microporous lattice type of structure, as is known.

Surfaces of the nodes and fibrils define numerous interconnecting pores that extend completely through the membrane 22 between the opposite major side surfaces 42, 44 of the membrane in a tortuous path. Preferably, the average size of the pores in the membrane 22 is sufficient to be deemed microporous, but any pore size may be used. A suitable average effective size for the pores in the membrane 22 may be in the range of 0.001 micron to 10 microns, and preferably in the range of 0.005 to 5.0 microns.

Typically, the porosity (i.e., the percentage of open space in the volume of the membrane 22) of the membrane 22 is between about 50% and about 98%. Often the porosity of the membrane 22 of a laminated article 20 suitable for many filtering or venting applications ranges from about 70% to about 95%, and preferably from about 80% to about 95%. The material and average pore size of the membrane 22 establish the hydrophobicity of the membrane.

The membrane 22 is preferably made by extruding a mixture of polytetrafluoroethylene (PTFE) powder resin and lubricant. The extrudate is then calendered. The calendered extrudate is then "expanded" or stretched in at least one direction and preferably two substantially orthogonal directions, to form the fibrils connecting the nodes in a three-dimensional matrix or lattice type of structure. "Expanded" is intended to mean sufficiently stretched beyond the elastic limit of the material to introduce permanent set or elongation to the fibrils. The membrane 22 is preferably then heated or "sintered" to reduce and minimize residual stress in the membrane material. However, the membrane 22 may be unsintered or partially sintered as is appropriate for the contemplated use of the membrane. An example of suitable membrane 22 properties includes a unit weight of about 0.42 ounce per square yard, an air permeability of about 1.0 CFM per square foot, a Mullen Water Entry pressure of about 15 PSI and a moisture vapor transmission rate (MVTR) of about 60,000 grams per square meter per day ($gr/m^2/day$).

It is known that porous ePTFE membrane 22, while having excellent hydrophobic properties, is oleophilic. That is, the material making up the membrane 22 is susceptible to contamination by absorbing oil. Once this occurs the contaminated regions of the membrane 22 are considered "fouled" because the pores can be easily wet by a challenge liquid, such as water, and the membrane is no longer considered hydrophobic.

Other materials and methods can be used to form a suitable membrane 22 that has an open pore structure. For example, other suitable materials that may be used to form a porous membrane include, but are not limited to, polyolefin, polyamide, polyester, polysulfone, polyether, acrylic and methacrylic polymers, polystyrene, polyurethane, polypropylene, polyethylene, cellulosic polymer, nylon and combinations thereof. Other suitable methods of making a microporous membrane 22 include foaming, skiving, casting or laying up fibers or nano-fibers of any of the suitable materials.

Some membranes 22, including, for example, many expanded PTFE membranes suitable for filtering or venting applications, are relatively thin and fragile. Porous textile fabrics 24a, 24b are included in the laminated article 20 to provide support and protection to both sides of the membrane 22. The textile fabrics 24a, 24b may have other or alternative functions including, for example, restricting or preventing the flow of the same and/or different particles and fluids as the membrane 22 and/or protecting the membrane 22 or other layers in the laminated article 20 from damage, such as abrasion.

The textile fabrics 24a, 24b are typically made from a porous knit, woven, non-woven or scrim of material. The textile fabrics 24a, 24b may be made of the same or different materials and constructions. Often the textile fabrics 24a, 24b are made using a fibrous material, however, other porous materials may also be used. The average pore size of the textile fabrics 24a, 24b is usually larger than the average pore size of the membrane 22, although this is not necessary in some applications. Thus, in some applications, the textile fabrics 24a, 24b act to at least partially filter the fluid flowing into or through the laminated article. Typically, the average pore size of the textile fabrics 24a, 24b is about 500 nm (micron) or less and often at least about 0.5 nm. The porosity of the textile fabrics 24a, 24b is often in the range of about 20% to almost 90%.

Suitable materials for the porous textile fabrics 24a, 24b include, for example, stretched or sintered polymers, such as polyesters, polypropylene, polyethylene, and polyamides (e.g., nylon). These materials are often available in various weights including, for example, about 0.5 $oz/yd^2$ to 15 $oz/yd^2$. Knit fabric such as tricot may also be used.

The textile fabrics 24a, 24b and the membrane 22 are laminated together. The lamination of the textile fabrics 24a, 24b and the membrane 22 can be accomplished by a variety of suitable methods, such as thermal lamination or adhesive lamination. FIG. 1 illustrates one aspect of a laminated article 20 in which the textile fabrics 24a, 24b and membrane 22 are adhered by thermal lamination. An example of the laminated article 20 is a woven textile fabric 24a or 24b adhesively laminated to the ePTFE membrane 22. The laminated article 20 also has a knit tricot textile fabric 24b or 24a adhesively laminated to the membrane 22.

Improved oleophobic and hydrophobic properties of the laminated article 20 are realized according to one aspect of the invention by treating surfaces defining the pores in the membrane 22 and textile fabrics 24a, 24b as well as the surfaces of the membrane sides 42a, 42b and the fabric sides 44a, 44b of the laminated article 20 with a fluorinated polymer treatment material, or fluorpolymer. A limiting factor for previously known laminated articles has been the lack of an effective way to introduce the treatment material into the pores of the membrane 22 of the laminated article 20 and to evenly coat the surfaces defining its pores. The laminated article 20, according to one aspect of the invention, has the treatment material coating even the smallest pores of the membrane 22 of the laminated article after lamination. The applied treatment material can modify properties of the entire laminated article 20, such as oleophobicity and hydrophobicity.

It has been found that an inorganic fluid under supercritical conditions can dissolve the preferred fluorinated polymer treatment material. The resulting solution is capable of wetting the laminated article 20 and entering pores in the microporous membrane 22 with the dissolved fluorinated polymer treatment material. The solution with dissolved fluorinated polymer treatment material has a surface tension, viscosity and relative contact angle that permit the dissolved treatment material to be easily carried into the smallest pores of the membrane 22 and the textile fabrics 24a, 24b with the solution.

The inorganic solvent is preferably carbon dioxide in a supercritical phase. The surface tension of the supercritical carbon dioxide ($SCCO_2$) solution is less than 1 dyne/cm and most preferably less than 0.1 dyne/cm so it can enter very small areas of the laminated article 20 to be treated, such as the pores of the membrane 22. Supercritical carbon dioxide also has a viscosity of less than about 0.1 centipoise. The viscosity and surface tension of the solution are extremely low so very little resistance to flow is encountered, thus, lending itself to the possibility of entering even the smallest pores of the membrane 22. Effective treatment is possible even if the laminated article 20 is in a confined state, such as in a tightly wound roll of sheet material.

The fluorinated polymer treatment material, or fluoropolymer, is deposited on and around surfaces of the nodes and fibrils that define the interconnecting pores extending through the membrane 22 and pores of the textile fabrics 24a, 24b. This results in a relatively thin and even coating being applied to virtually all the surfaces of the laminated article 20. Once a predetermined proper amount of fluorinated polymer treatment material is deposited on the laminated article 20 the pores are not dramatically reduced in flow area from that of an untreated laminated article. Improved oleophobic properties are realized in the pores of the membrane 22 and textile fabrics 24a, 24b as well as on the membrane sides 42a, 42b and the fabric sides 44a, 44b of the laminated article 20.

Examples of suitable fluorinated polymer treatment materials include those having a fluoroalkyl portion or, preferably, a perfluoroalkyl portion. One such fluorinated polymer treatment material is a perfluorakyl acrylic copolymer referred to as Fabati 100 and was designed and synthesized by Micell Technologies, Inc. Fabati 100 was synthesized in MIBK (methyl isobutyl ketone) utilizing TAN (1,1,2,2,-tetrahydroperfluorooctyl acrylate); butyl acrylate; a cross-linking agent TMI (isopropenyl-a,a-dimethylbenzyl isocyanate); Vazo 52 initiator (2,4-dimethyl-2,2'-azobispentanenitrile). The Fabati 100 treatment material is cross-linked by a post-treatment cure with heat. Another suitable perfluorakyl acrylic copolymer is Fabati 200. Fabati 200 is similar to Fabati 100 but does not have the cross-linking agent (TMI) and HBA (4-hydroxybbutyl acrylate) is used instead of butyl acrylate. Thus, the Fabati 200 treatment material does not require post-treatment heating.

A variety of inorganic solvents can be used in the solution containing the oleophobic fluorinated polymer treatment material. The term "inorganic solvent" refers to non-aqueous solvents and combinations of non-aqueous solvents, and, in particular, to solvents comprising inorganic compounds. Suitable inorganic solvents include, for example, carbon dioxide ($CO_2$), ammonia ($NH_3$), urea [$(NH_2)_2CO$], inorganic acids, such as hydrochloric acid, sulfuric acid, carbon tetrachloride and carbon tetrafluoride and oxides of carbon such as carbon dioxide ($CO_2$), carbon monoxide (CO), potassium carbonate and sodium bicarbonate. A choice of solvent or solvents may be affected by a variety of factors including solubility of the treatment material in the solvent, molecular weight of the solvent and polarity of the solvent. In preferred aspects of the invention, the treatment material is completely dissolved in the inorganic solvent. In other aspects of the invention, the treatment material is not fully dissolved in the inorganic solvent.

The amount of fluorinated polymer treatment material in the solution may vary over a wide range. Typically, the amount of fluorinated polymer treatment material in the solution affects the resultant oleophobicity of the laminated article 20. Typically, the amount of fluorinated polymer treatment material, or fluoropolymer, in the solution is about 25 wt % or less and preferably, about 10 wt % or less. For many applications, that the laminated article 20 is used in, the amount of fluoropolymer treatment material in the inorganic solvent ranges from about 0.8 wt % to about 10.0 wt % and preferably, from about 2.0 wt % to about 5.0 wt %.

The textile fabrics 24a, 24b and membrane 22 of the laminated article 20 are treated together subsequent to lamination of the textile fabrics and membrane. Typically, during treatment, the fluorinated polymer solution wets and, preferably, saturates, the textile fabrics 24a, 24b and membrane 22 of the laminated article 20. The use of an inorganic solvent facilitates the distribution of the fluorinated polymer treatment material throughout the textile fabrics 24a, 24b and membrane 22 of the laminated article. The inorganic solvent is then removed and the fluorinated polymer treatment material precipitates out of solution. The fluorinated polymer treatment material attaches to the textile fabrics 24a, 24b and membrane 22 and enhances the oleophobic and hydrophobic properties at both sides 44a, 44b of the laminated article 20.

Optionally, the treated laminated article 20 may then be "cured" by heating. The "curing" process increases the oleophobicity by allowing rearrangement of the fluoropolymer into a more oleophobic orientation. The curing temperature varies among fluoropolymers.

The laminated article 20 has a relatively high moisture vapor transmission rate (MVTR) and air permeability while its oleophobic and hydrophobic properties are improved by the treatment material. Both sides 44a, 44b of the laminated article 20 have an oil hold out rating of at least a number 7 rating as determined by AATCC 118 testing and preferably at least a number 8 rating. The laminated article 20 preferably has a moisture vapor transmission rate (MVTR) of at least 1500 gr/m$^2$/day and more preferably at least 5000 g/m$^2$/day measured by JISL-1099B2 testing. The laminated article 20 preferably has an air-permeability of at least 0.01 CFM per square foot of material, preferably at least 0.05 CFM per square foot of material and more preferably at least 0.15 CFM per square foot of material measured by ASTM D737 testing. The laminated article 20 preferably has a Mullen Water Entry pressure of at least 10 PSI, preferably at least 15 PSI and more preferably 30 PSI.

The term "oleophobic" is used to describe a material property that is resistant to contamination from absorbing oils, greases, soap, detergent or body fluids, such as perspiration. An "oleophobic property" or "oleophobicity" of the laminated article 20 is typically rated on a scale of 1 to 8 according to AATCC test 118. This test objectively evaluates an article's resistance to wetting by various standardized challenge liquids having different surface tensions. Eight standard challenge liquids, labeled #1 to #8, are used in the test. The #1 challenge liquid is mineral oil (surface tension: 31.5 dynes/cm at 25° C.) and the #8 challenge liquid is heptane (surface tension: 14.8 dynes/cm at 25° C.). Five drops of each challenge liquid are placed on one side of the laminated article 20 to be tested. Failure occurs when wetting of the laminated article 20 by a selected challenge liquid occurs within 30 seconds.

The oleophobic rating number of a tested laminated article 20 corresponds to the last challenge liquid successfully tested. The higher the oleophobic number rating, the better the oleophobic property, or oleophobicity, as evidenced by resistance to penetration by challenge liquids of relatively lower surface tension. Both of the exterior surface sides 44a, 44b of the laminated article 20 can pass a challenge by n-octane for at least a #7 oil hold out rating. This is a significant improvement over previously known laminated articles.

The laminated article 20 has a water-proofness determined by a Mullen Water Entry Test (ASTM Standard D751-00 Method A). Mullen Water Entry Test is a test method that measures the ability of a fabric to resist leakage by pressure exerted by water. A hydrostatic force is applied to the laminated article 20 that is to be tested and is used to determine the pressure at which the laminated article begins to leak. The water entry pressure is measured in kilopascals or in PSI.

The laminated article 20 is mounted in a Mullen Water Entry test apparatus. Water is forced against an unsupported area of a challenge side of the laminated article 20. The instant the laminated article 20 begins to leak, the inflation pressure drops. The pressure is recorded and is indicative of the resistance of the laminated article 20 to leakage. The laminated article 20 has a Mullen Water Entry of at least 10 PSI, preferably at least 15 PSI and most preferably at least 30 PSI.

Samples of the laminated article 20 were treated with fluorinated polymer treatment material according to one aspect of the invention. Sample laminate 1 has a 2.71 oz/sq yd nylon spun touch woven fabric 24a adhesively laminated to one side 42a of the membrane 22 and a tricot knit fabric 24b adhesively laminated to the opposite side 42b of the membrane. The microporous membrane 22 is QM011 available from BHA Group, Inc. Sample laminate 2 has a 1.77 oz/sq yd nylon ripstop woven fabric 24a adhesively laminated to one side 42a of the membrane 22 and a tricot knit fabric 24b adhesively laminated to the opposite side 42b of the membrane. The microporous membrane 22 is QM011 available from BHA Group, Inc. The properties that resulted from the treatment of the laminated article 20 are reported in the following table.

| | Oil Hold Out | | | Mullen Water Entry (PSI) | | |
|---|---|---|---|---|---|---|
| Sample | First Fabric Side | Second Fabric Side | Air Perm (CFM/ft$^2$) | First Fabric Side | Second Fabric Side | MVTR (g/m$^2$/day) |
| 1 | 8 | 8 | 0.186 | 83 | 88 | 7,400 |
| 2 | 8 | 8 | 0.282 | 86 | 92 | 14,900 |

Figure 2:
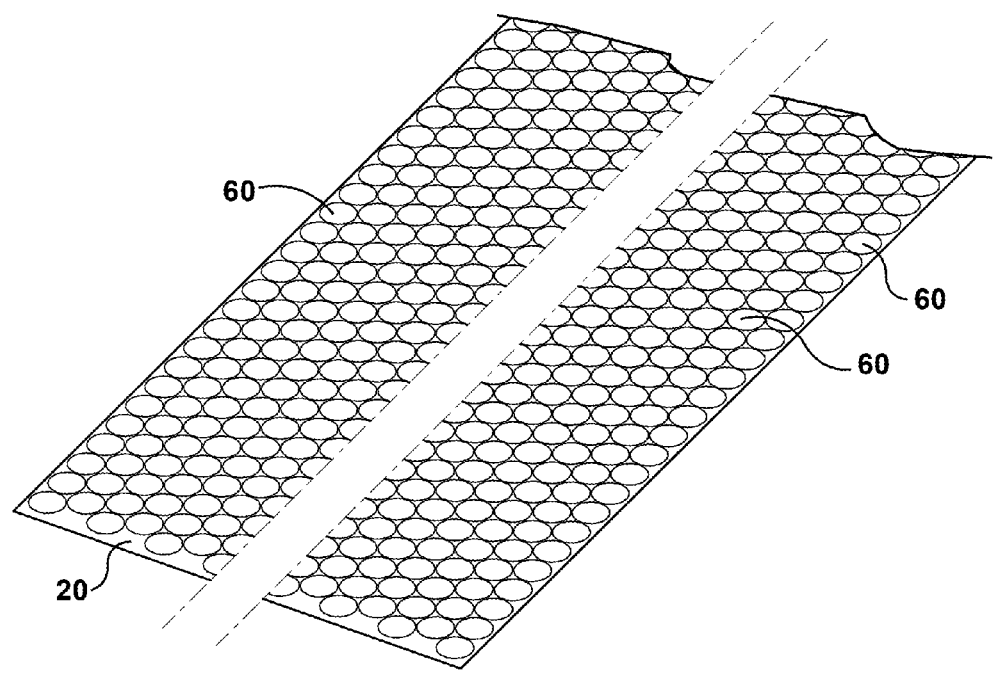
FIG. 2 is a perspective representation of a plurality of vents made from the laminated sheet material, illustrated in FIG. 1, according to another aspect of the invention.

Another aspect of the laminated article 20 of the invention is illustrated in FIG. 2. A plurality of vents 60 are die cut from the laminated article 20. Examples of applications in which the vents 60 made from the improved oleophobic laminated article 20 can be used include, without limitation, oil sensors, disk drives, gas sensors, optical sensors, pressure transducers, headlamp assembly vents, cellular phone vents, battery vents, numerous motor, automotive and medical vents, breathers or filters. The use of the laminated articles 20 is not restricted to electronic devices. Other applications use vent filters to permit air flow through a port in the housing. Examples of these assemblies include, without limitation, sterile packaging, other packaging, medical devices, chain saw vents, ink-jet cartridges, chemical vents, anti-lock braking system (ABS) vents, and air bags.

Figure 4:
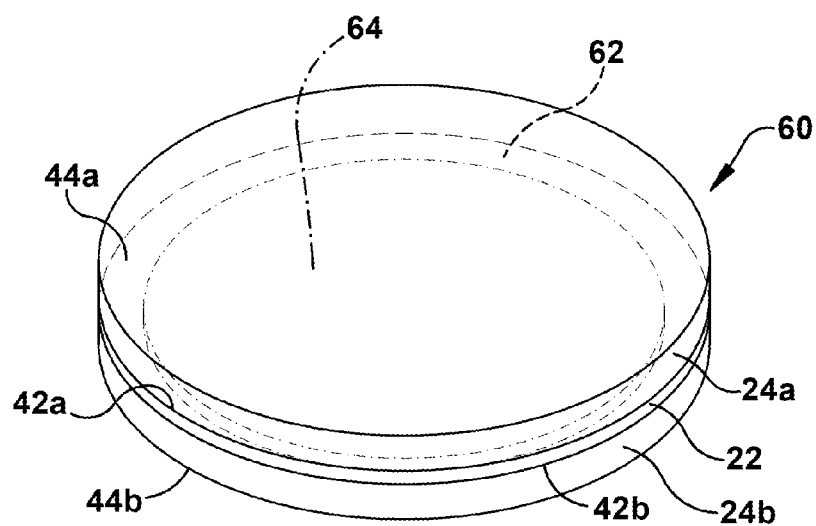
FIG. 4 is an enlarged perspective view of one of the vents illustrated in FIG. 2.

At least one aspect of the laminated article 20 of FIG. 4 is useful, for example, as a vent 60. In this embodiment, the laminated article 20 has a portion 62 of the surface 44b of the textile fabric 24b that is optionally covered with adhesive and another central portion 64 that is not covered with the adhesive. In operation, the vent 60 may be placed over an opening of a component, such as a housing or container, that requires venting. The adhesive portion 62 would engage the component to attach the vent 60 to the component. A gas, such as air or moisture vapor, may then flow through the central portion 64 of the vent 60 with contaminants (e.g., particulate matter, water, and/or oily materials) being prevented or restricted from flowing through the central portion of the vent.

One application of a vent 60 made using the laminated article 20 of the invention is in the context of a headlamp assembly for a vehicle, such as, for example, a car, bus, motorcycle, or truck. A headlamp assembly includes a light source and a housing around the light source to protect the light source from damage and water. Heating or cooling of the light source can damage the light source if venting of moisture vapor is not provided in the housing while inhibiting liquid water from entering the housing. Since the headlamp assembly is used in wet, dirty and oily environments it is desirable to have the vent 60 be oleophobic and hydrophobic.

Figure 5:
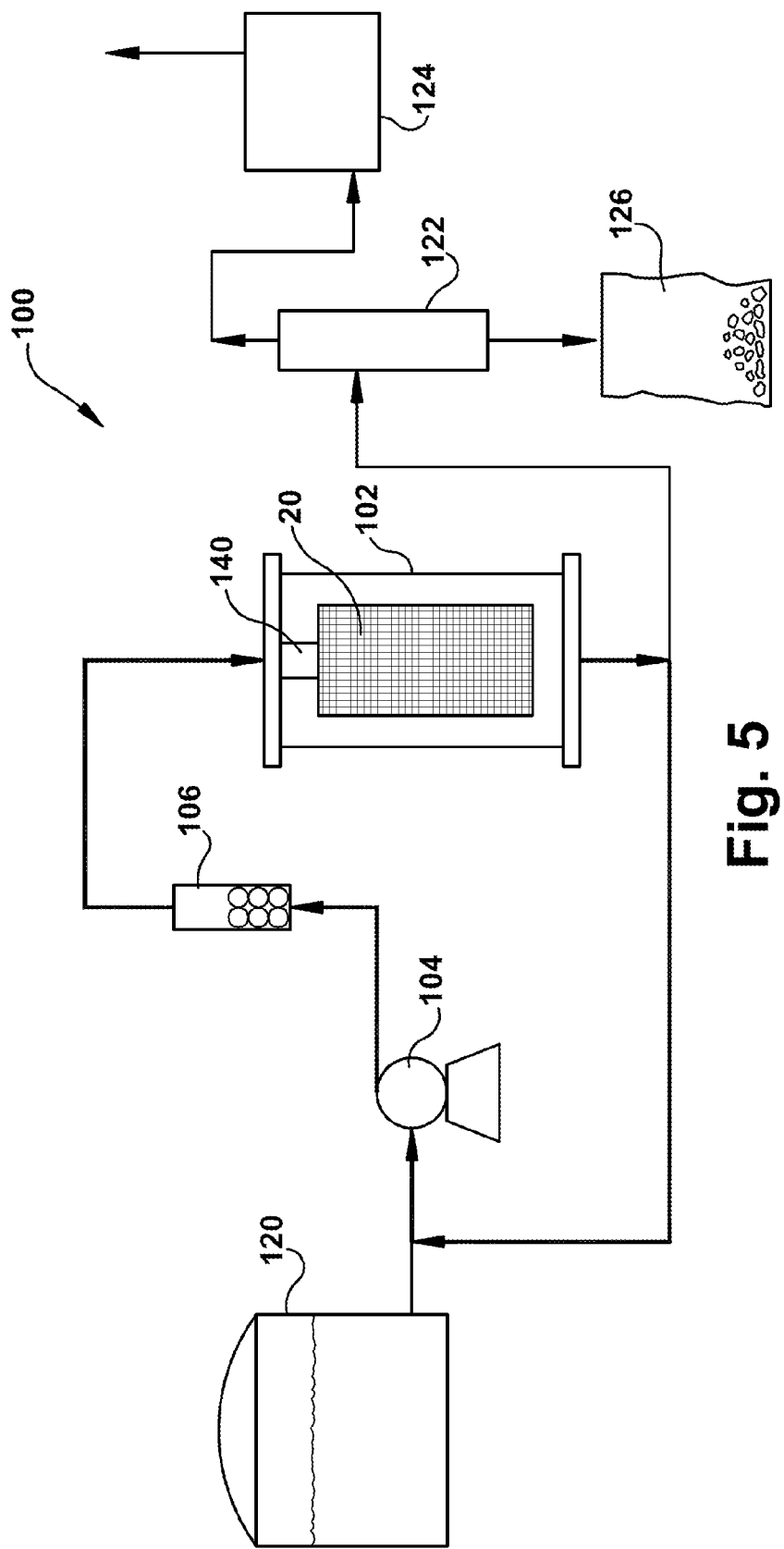
FIG. 5 is a schematic representation of the system and method used to treat the laminated sheet material, according to another aspect of the invention.

A system 100 for use in the method of treating the laminated article 20 according to one aspect of the invention is schematically illustrated in FIG. 5. The system 100 includes a vessel 102 for treating the laminated article 20. The vessel 102 is a pressure vessel capable of withstanding pressure up to 5,000 psi (about 345 bar) and elevated temperature in the range of 100° C. (212° F.). The vessel 102 is sized appropriately to treat the desired width and length of laminated article 20. The vessel 102 is fluidly connected to a supply and circulation pump 104. A treatment material introduction vessel 106 is located between the vessel 102 and pump 104.

Pump 104 is also connected to a solvent storage container 120. The storage container 120 houses liquid solvent under pressure and is maintained at a temperature to assure delivery of solvent in a liquid phase to pump 104. In one aspect of the invention, the solvent is carbon dioxide ($CO_2$). The vessel 102 is also connected to separation and recovery station 122. The separation and recovery station 122 is connected to a filtration system 124 that is vented to atmosphere. The separation and recovery station 122 is also connected to treatment recovery container 126 for recovering treatment material solids.

An untreated article, such as approximately 50 to 80 yards of 58-inch wide laminated sheet material is rolled onto a core 140 and secured at axially opposite ends to hold the roll of sheet material on the core and prevent fluid flow axially out the ends of the roll. The core 140 is made from any suitable material, such as perforated stainless steel. The core 140 and roll of sheet material are placed in the vessel 102. The vessel 102 is sealed. The core 140 and roll of sheet material are supported in the vessel 102 so the sheet material does not contact the interior wall of the vessel and fluid flow can occur around the entire roll. The sheet material is made from materials that do not dissolve in the selected solvent.

Particle solids of suitable fluorinated polymer treatment material are placed in the treatment introduction vessel 106. The amount of treatment material depends on the solution concentration desired in the system. For example, 5000 grams of treatment material may be used.

Liquid solvent, such as the preferred carbon dioxide, flows from the storage container 120, through the pump 104, through the treatment material introduction vessel 106 and into the vessel 102 and the associated lines at the storage pressure. Pump 104 is started to circulate the solvent and increase pressure. Pump 104 raises the pressure in the system to a predetermined pressure. The predetermined pressure may be selected to provide optimal solvent properties to the carbon dioxide, such as raising the solvent to a supercritical state. Solvent flows from the pump 104, through the treatment material introduction vessel 106. The solvent dissolves treatment material in the treatment material introduction vessel 106 forming a solution that is fed into the vessel 102.

System pressure increases to a desired predetermined pressure. The temperature and pressure of the solvent are controlled as determined by the solubility of the treatment material to be in a phase or condition so the treatment material may dissolve for a desired solute concentration. Pressure and volume of solvent may be increased in a known manner by a make-up supply and pump (not shown).

For example, when supercritical carbon dioxide ($SCCO_2$) is at 3600 PSIG or higher pressure and a temperature of 40° C., the preferred treatment material dissolves. The treatment material in the treatment material introduction vessel 106 dissolves in the solvent flowing through it at supercritical conditions. It will also be apparent that the treatment material can be in liquid form and pumped into the system 100.

Flow through the treatment material introduction vessel 106 continues until the desired concentration of the treatment material solute in the solvent is attained. This flow path is maintained until the desired amount of solids in the treatment introduction vessel 106 is dissolved to obtain a desired predetermined concentration of treatment material in the solution.

Once the desired system conditions are reached, the treatment material solute and solvent in the solution are circulated through the system 100 for an appropriate predetermined time. The flow path may be any suitable flow path. By way of example, the solution is routed through the pump 104, through the treatment material introduction vessel 106, into the interior of the core 140 in the treatment vessel 102, through the roll of sheet material, into the treatment vessel, and then back to pump. This flow maintenance for a period of time assures that the treatment material is uniformly dissolved in the inorganic solvent and that every surface of the roll of sheet material has been exposed to the treatment material solution.

The pressure and/or temperature of the solution are/is then permitted to change to a condition in which the treatment material solute is no longer soluble. The treatment material precipitates out of the solution when it first becomes insoluble. The precipitated treatment material deposits onto the surfaces of the laminated article 20. The pressure can then be further reduced to atmospheric so the vessel 102 can be opened. The deposited treatment material does not block the pores of the membrane 22 or textile fabrics 24a, 24b so air permeability of the laminated article 20 is not adversely affected. The deposited treatment material covers all or at least substantially all of the surfaces in the laminated article 20. Such surfaces include the surfaces defining the pores of the membrane 22 and the textile fabrics 24a, 24b. Such surfaces also include the outer surfaces 42a, 42b of the membrane 22 and the outer surface 44a, 44b of the textile fabrics 24a, 24b.

Heat may optionally be applied to the treated laminated article 20 if it was treated with a treatment material that included a cross-linking agent, such as Fabati 100. Heat may be applied at about 280° F. (165° C.) heat for about 60 minutes to the laminated article 20 to cross-link the treatment material.

Although the aspects herein have been disclosed in the context of certain preferred embodiments and examples, it will be understood by those skilled in the art that the invention extends beyond the specifically disclosed embodiments to other alternative embodiments and/or uses of the systems and techniques herein and obvious modifications and equivalents thereof. Thus, it is intended that the scope of the invention disclosed should not be limited by the particular disclosed embodiments described above, but should be determined only by a fair reading of the claims that follow.

Having described at least one aspect of the invention, what is claimed is:

1. An article comprising:
a fluoropolymer-treated laminate that comprises
a microporous membrane;
a first porous fabric laminated to a first side of the microporous membrane;
a second porous fabric laminated to a second opposite side of the microporous membrane to form a laminate with the membrane and the first porous fabric, the laminate having two fabric sides separated by the microporous membrane; and
a treatment material comprising a fluoropolymer dissolved in an inorganic solvent, wherein the treatment material is applied to the laminate to form the fluoropolymer-treated laminate, the fluoropolymer-treated laminate having an oil resistance of at least a number 7 determined by AATCC 118 testing on both fabric sides and having an air permeability through the treated laminate of at least 0.01 CFM per square foot determined by ASTM D737 testing.

2. The article of claim 1 wherein the microporous membrane is selected from the group consisting essentially of expanded polytetrafluoroethylene (ePTFE), polyurethane, polypropylene, polyethylene, polyether sulfone, polyvinylidene fluoride, nylon and polycarbonate.

3. The article of claim 1 wherein the microporous membrane is thermally laminated to at least one of the first and second porous fabrics.

4. The article of claim 1 wherein the microporous membrane is adhesively laminated to at least one of the first and second porous fabrics.

5. The article of claim 1 wherein the treatment material comprises a fluorinated alkyl acrylic copolymer.

6. The article of claim 5 wherein the fluorinated alkyl acrylic copolymer is cross-linked.

7. The article of claim 1 wherein the fluoropolymer-treated laminate has a moisture vapor transmission rate (MVTR) of at least 1500 gr/m2/day determined by JISL-1099B2 testing.

8. The article of claim 1 wherein the fluoropolymer-treated laminate has a Mullen Water Entry pressure determined by challenging the membrane side of at least 10 PSI.

9. The article of claim 1 wherein the fluoropolymer-treated laminate has an air permeability of at least 0.15 CFM per square foot.

10. The article of claim 1 wherein the fluoropolymer-treated laminate has an oil resistance of a number 8 determined by AATCC 118 testing on both fabric sides and having an air permeability through the treated laminate of at least 0.15 CFM per square foot determined by ASTM D737 testing.

11. A vent comprising:
a fluoropolymer-treated laminate that comprises
a microporous membrane of expanded polytetrafluoroethylene (ePTFE);
a first porous fabric laminated to a first side of the microporous membrane;
a second porous fabric laminated to a second opposite side of the microporous membrane to form a laminate with the membrane and the first porous fabric, the laminate having two fabric sides separated by the microporous membrane; and
a treatment material comprising a fluoropolymer dissolved in an inorganic solvent, wherein the treatment material is applied to the laminate to form the fluoropolymer-treated laminate, the fluoropolymer-treated laminate having an oil resistance of at least a number 7 determined by AATCC 118 testing on both fabric sides and having an air permeability through the treated laminate of at least 0.01 CFM per square foot determined by ASTM D737 testing.

12. An article comprising:

a fluoropolymer-treated laminate that comprises a microporous membrane of expanded polytetrafluoroethylene (ePTFE);

a first porous fabric laminated to a first side of the microporous membrane;

a second porous fabric laminated to a second opposite side of the microporous membrane to form a laminate with the membrane and the first porous fabric, the laminate having two fabric sides separated by the microporous membrane; and a treatment material comprising a fluoropolymer dissolved in an inorganic solvent, wherein the treatment material is applied to the laminate to form the fluoropolymer-treated laminate, the fluoropolymer-treated laminate having an oil resistance of a number 8 determined by AATCC 118 testing on both fabric sides having an air permeability through the treated laminate of at least 0.05 CFM per square foot determined by ASTM D737 testing and having a Mullen Water Entry pressure determined by challenging the membrane side of at least 10 PSI.

13. The article of claim 12 wherein the microporous membrane is thermally laminated to at least one of the first and second porous fabrics.

14. The article of claim 12 wherein the treatment material comprises a fluorinated alkyl acrylic copolymer.

15. The article of claim 14 wherein the fluorinated alkyl acrylic copolymer is cross-linked.

16. The article of claim 12 wherein the fluoropolymer-treated laminate has a moisture vapor transmission rate (MVTR) of at least 1500 gr/m2/day determined by JISL-1099B2 testing.

17. The article of claim 12 wherein the microporous membrane is adhesively laminated to at least one of the first and second porous fabrics.

\* \* \* \* \*